US006118057A

United States Patent [19]

Chang

[11] Patent Number: 6,118,057

[45] Date of Patent: Sep. 12, 2000

[54] ELECTRIC GUITAR STRING TENSION ADJUSTMENT STRUCTURE

[76] Inventor: I-Ping Chang, No. 51, Shu-I 5th Lane, Shu-I Li, South Dist., Taichung, Taiwan

[21] Appl. No.: 09/360,650

[22] Filed: Jul. 26, 1999

[51] Int. Cl.[7] .......... G01D 3/04

[52] U.S. Cl. .......... 84/298; 84/307

[58] Field of Search .......... 84/298, 307, 267, 84/299, 306

[56] References Cited

U.S. PATENT DOCUMENTS 5,277,094 1/1994 Spuler .......... 84/298

*Primary Examiner*—Bentsu Ro
*Assistant Examiner*—Shih-yung Hsieh
*Attorney, Agent, or Firm*—Bacon & Thomas, PLLC

[57] ABSTRACT

An electric guitar string tension adjustment structure, which includes a bridge body mounted on a bottom block to hold a tremolo arm, a set of saddle blocks transversely adjustably fastened to the bridge body by screws, each saddle block having an elongated slot which guides a respective string, a plurality of tension screw studs respectively mounted in respective vertical locating holes at the saddle blocks to support respective strings being guided out of the saddle blocks to the head of the electric guitar, a plurality of adjustment nuts respectively mounted in respective horizontal slots at the saddle blocks and threaded onto the tension screw studs and rotated to change the elevation of the respective tension screw studs, enabling the tension of the respective strings to be adjusted, and a screwdriver for inserting into an insertion hole at each of the saddle blocks to mesh with the toothed peripheral wall of the respective adjustment nut for enabling the respective adjustment nut to be turned with the screwdriver.

4 Claims, 10 Drawing Sheets

ELECTRIC GUITAR STRING TENSION ADJUSTMENT STRUCTURE

BACKGROUND OF THE INVENTION

The present invention relates to an electric guitar, and more particularly to a string tension adjustment structure for an electric guitar.

An electric guitar, as shown in FIG. 1, comprises a string tension adjustment structure, namely, the bridge and tremolo arm assembly for controlling the tension of the strings. The bridge and tremolo arm assembly, as shown in FIG. 2, comprises a bridge body, a set of tension adjustment blocks mounted on the bridge body for controlling the tension of the strings. Each tension adjustment block comprises two adjustment screws for elevation adjustment. Because the elevation of each tension adjustment block is controlled by two adjustment screws, it is difficult to accurately adjust the two adjustment screws of each of the tension adjustment blocks to same elevation. If the two adjustment screws are not accurately adjusted to same elevation, the tension adjustment block cannot be maintained in balance, and noise will be produced, and picked up by the middle, treble or lead pick-up.

SUMMARY OF THE INVENTION

The present invention has been accomplished to provide a string tension adjustment structure for an electric guitar which eliminates the aforesaid problem. It is one object of the present invention to provide a string tension adjustment structure for an electric guitar which can conveniently be operated to individually accurately adjust the tension of the strings. It is another object of the present invention to provide a string tension adjustment structure for an electric guitar which is constantly maintained in balance so that no noise is produced when the electric guitar is played. According to one aspect of the present invention, the string tension adjustment structure comprises a bridge body mounted on a bottom block to hold a tremolo arm, a set of saddle blocks transversely adjustably fastened to the bridge body by screws, each saddle block having an elongated slot, which guides a respective string, a plurality of tension screw studs respectively mounted in respective vertical locating holes at the saddle blocks to support respective strings being guided out of the saddle blocks to the head of the electric guitar, and a plurality of adjustment nuts respectively mounted in respective horizontal slots at the saddle blocks and threaded onto the tension screw studs, the adjustment nuts being rotated by hand to change the elevation of the respective tension screw studs, causing the tension of the respective strips to be adjusted. According to another aspect of the present invention, the saddle blocks each have a locating flange inserted into a respective transverse slot at the bridge body, therefore the saddle blocks neither vibrate nor make a noise when horizontally adjusted. According to still another aspect of the present invention, a screwdriver is provided having a threaded shank for insertion into an insertion hole at each of the saddle blocks to mesh with the toothed peripheral wall of the respective adjustment nut, for enabling the respective adjustment nut to be turned with the screwdriver.

DETAILED DESCRIPTION OF THE PREFERRED EMBODIMENT

Figure 1:
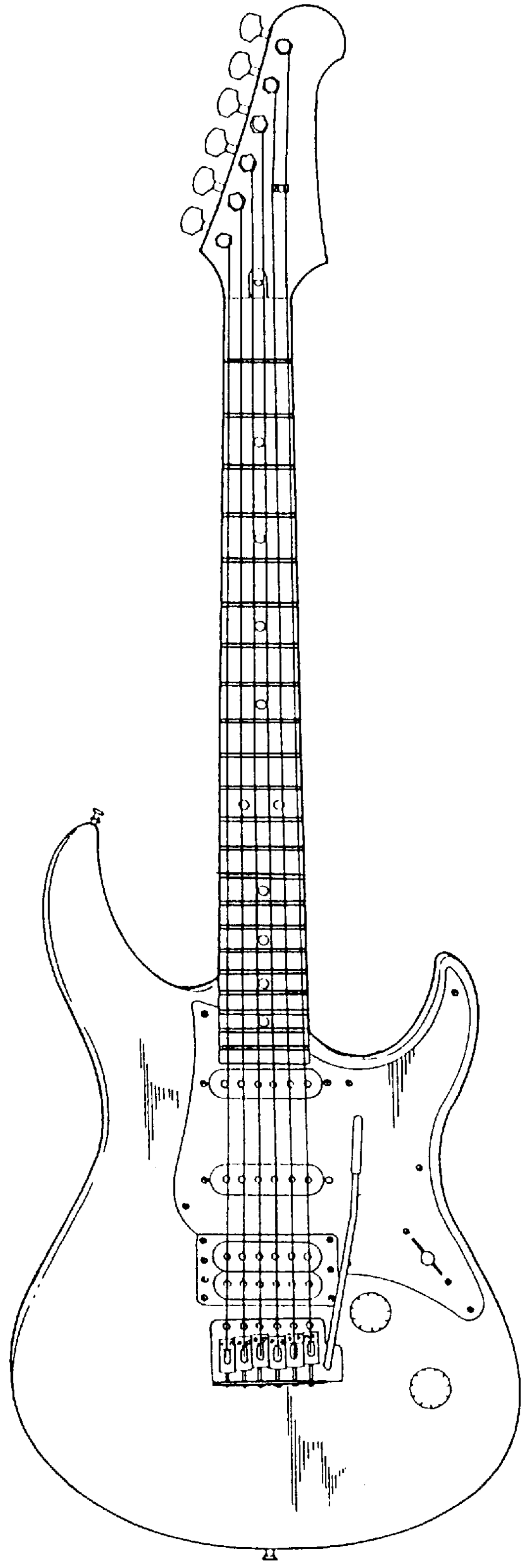
Fig.1 PRIOR ART
FIG. 1 is a plain view of a regular electric guitar according to the prior art.
Figure 2:
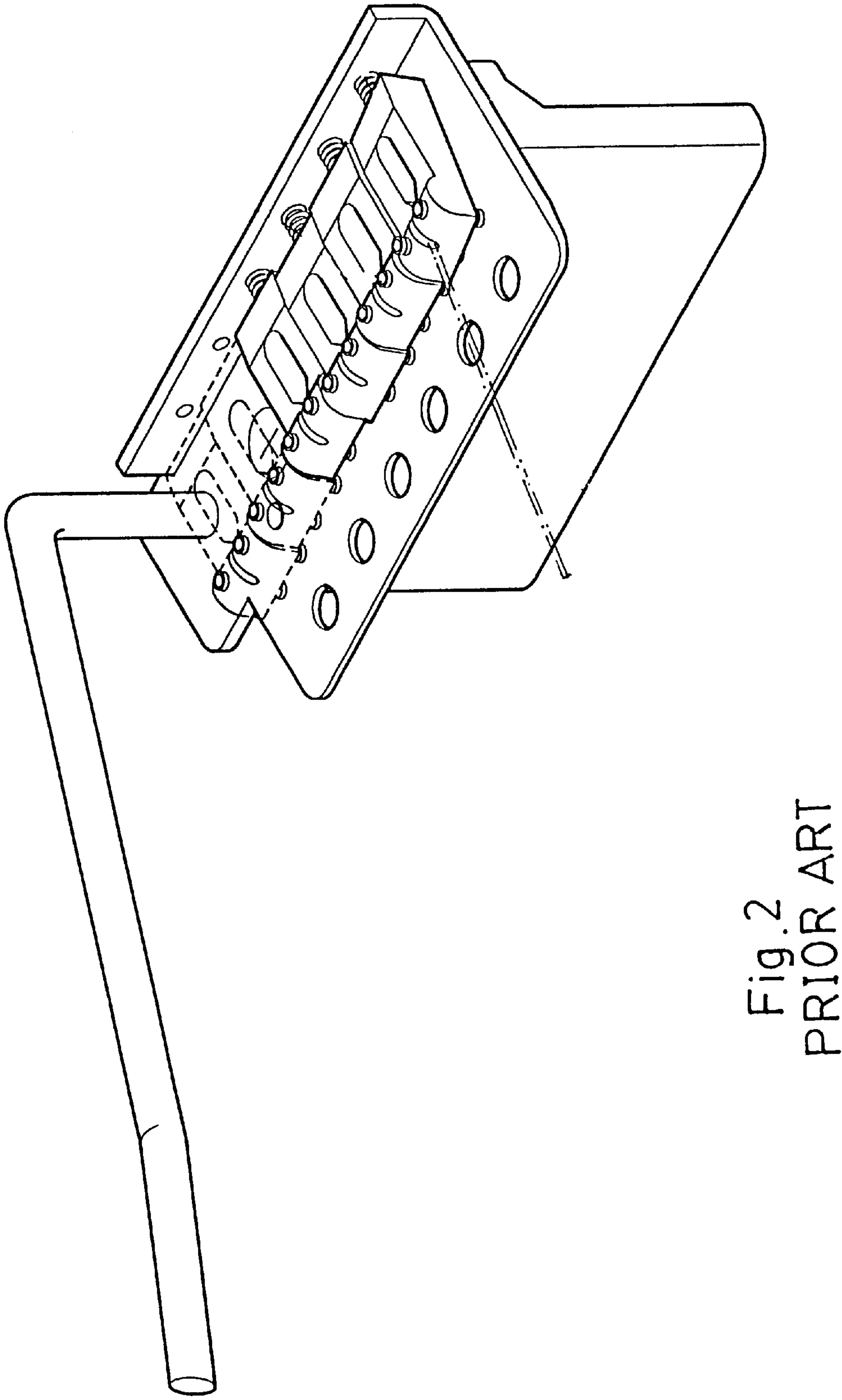
Fig.2 PRIOR ART
FIG. 2 is a perspective view of a string tension adjustment structure for an electric guitar according to the prior art.
Figure 3:
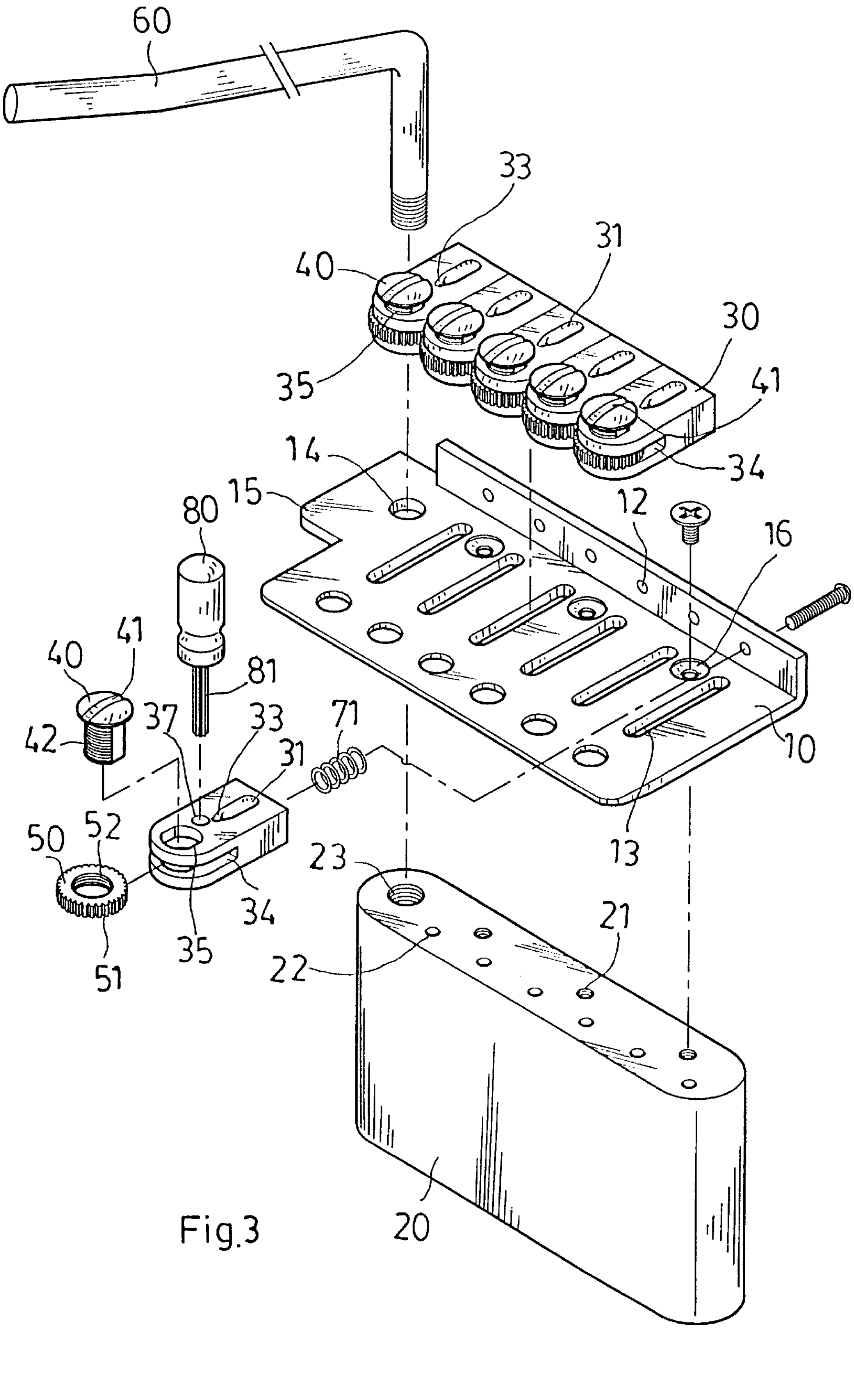
FIG. 3 is an exploded view of the string tension adjustment structure according to the present invention.

Referring to Figures from 3 through 7, a string tension adjustment structure for an electric guitar is shown comprised of a bridge body 10, a bottom block 20, a plurality of saddle blocks 30, a plurality of tension screw studs 40, a plurality of adjustment nuts 50, a tremolo arm 60, and an adjustment screwdriver 80.

The bridge body 10 is a flat, substantially L-shaped frame, comprising a row of round holes 11 longitudinally arranged along one side of the horizontal wall thereof, a row of through holes 12 arranged on the vertical side wall thereof corresponding to the round holes 11, a plurality of transverse slots 13 arranged in parallel between the round holes 11 and the through holes 12, an extension plate 15 longitudinally extended from one end of the horizontal side wall, a through hole 14 at the extension plate 15, and a plurality of countersunk holes 16 longitudinally arranged along one side of the horizontal side wall in parallel to and remote from the round holes 11 and spaced from one another by the transverse slots 13.

The bottom block 20 is provided to support the bridge body 10, having a plurality of screw holes 21 respectively fastened to the countersunk holes 16 at the bottom side of the bridge body 10 by screws, a plurality of stepped string mounting holes 22 through top and bottom sides thereof corresponding to the transverse slots 13 at the bridge body 10 which receive a respective string 70 (see FIG. 5), and a screw hole 23 corresponding to the through hole 14 at the projecting portion 15 of the bridge body 10.

Figure 7:
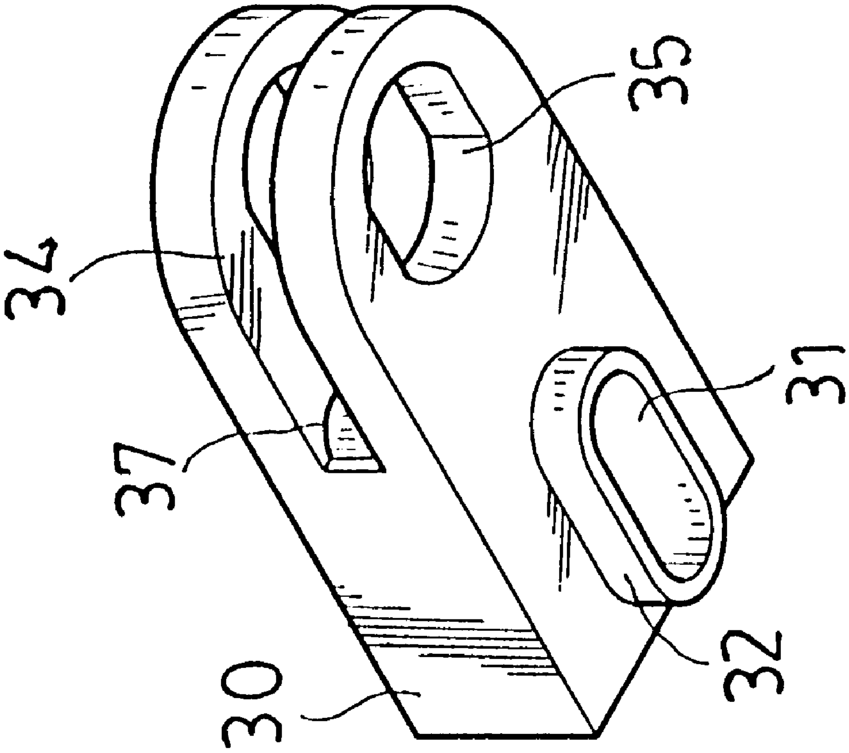
FIG. 7 is an oblique view in elevation of one saddle block according to the present invention.
Figure 8:
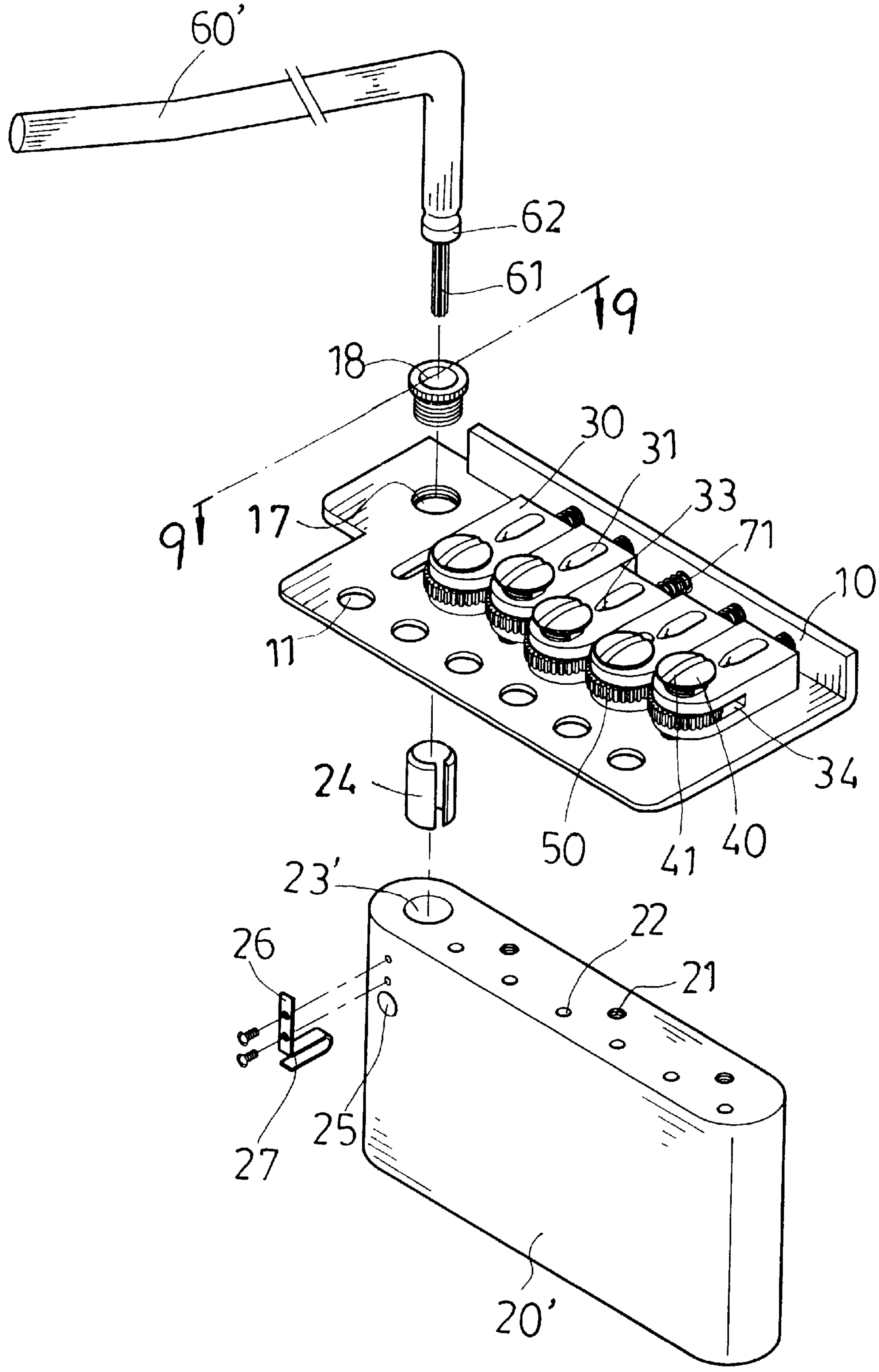
FIG. 8 is an exploded view of an alternate form of the string tension adjustment structure according to the present invention.

The saddle blocks 30 are respectively mounted on the bridge body 10 and connected to the through holes 12 at the vertical side wall of the bridge body 10. Each of the saddle blocks 30 comprises an elongated slot 31 disposed in vertical alignment with one transverse slot 13 at the bridge body 10 to guide one string 70, a locating flange 32 raised from the bottom side wall around the elongated slot 31 (see FIG. 7) and moved with the respective saddle block 30 back and forth along the corresponding transverse slot 13, a smoothly curved string guide edge 33 at the front end of the elongated slot 31 that guides the respective string 70 out of the elongated slot 31, a non-circular vertical locating hole 35 at the front end, a horizontal slot 34, a horizontal screw hole 36 at the rear end connected to one through hole 12 at the vertical side wall of the bridge body 10 by a fastening element, for example a screw, and a vertical insertion hole 37 spaced between the elongated slot 31 and the locating hole 35 in communication with the horizontal slot 34. A compression spring 71 is retained between the vertical side wall of the bridge body 10 and one saddle block 30 around the respective screw, which is fastened to one through hole 12 at the bridge body 10 and the horizontal screw hole 36 at the corresponding saddle block 30.

The tension screw studs 40 are respectively mounted in the vertical locating holes 35 at the saddle blocks 30 (see FIG. 5), each comprising a round head with a string groove 41 which guides one string 70 (see FIG. 5), a threaded, non-circular stem 42 fitting the vertical locating hole 35 at one saddle block 30, and an axially extended bottom hole 43 which receives one piezoelectric ceramic element 72 tending to increase sound.

The adjustment nuts 50 are respectively mounted in the horizontal slots 34 at the saddle blocks 30, each having a center screw hole 52 respectively threaded onto the threaded, non-circular stems 42 of the tension screw studs 40, and a toothed peripheral wall 51.

The tremolo arm 60 is mounted in the through hole 14 at the extension plate 15 of the bridge body 10, and threaded into the screw hole 23 at the bottom block 20.

The screwdriver 80 comprises a toothed shank 81, which is meshed with the toothed peripheral wall 51 of the respective adjustment nut 50 when inserted into the insertion hole 37 at one saddle block 30, enabling the respective adjustment nut 50 to be turned with the screwdriver 80.

Figure 4:
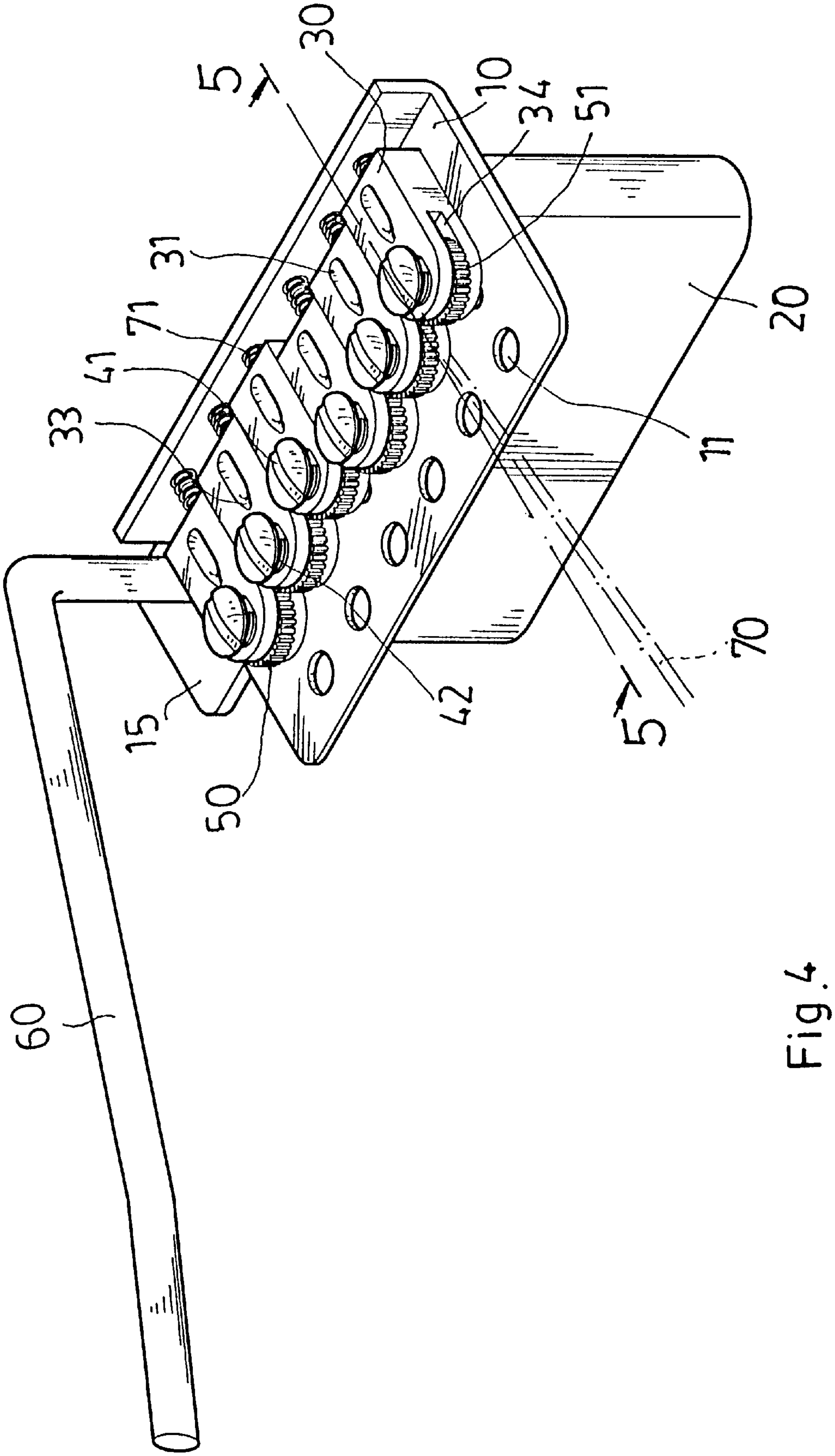
FIG. 4 is a perspective assembly view of the string tension adjustment structure shown in FIG. 3.
Figure 5:
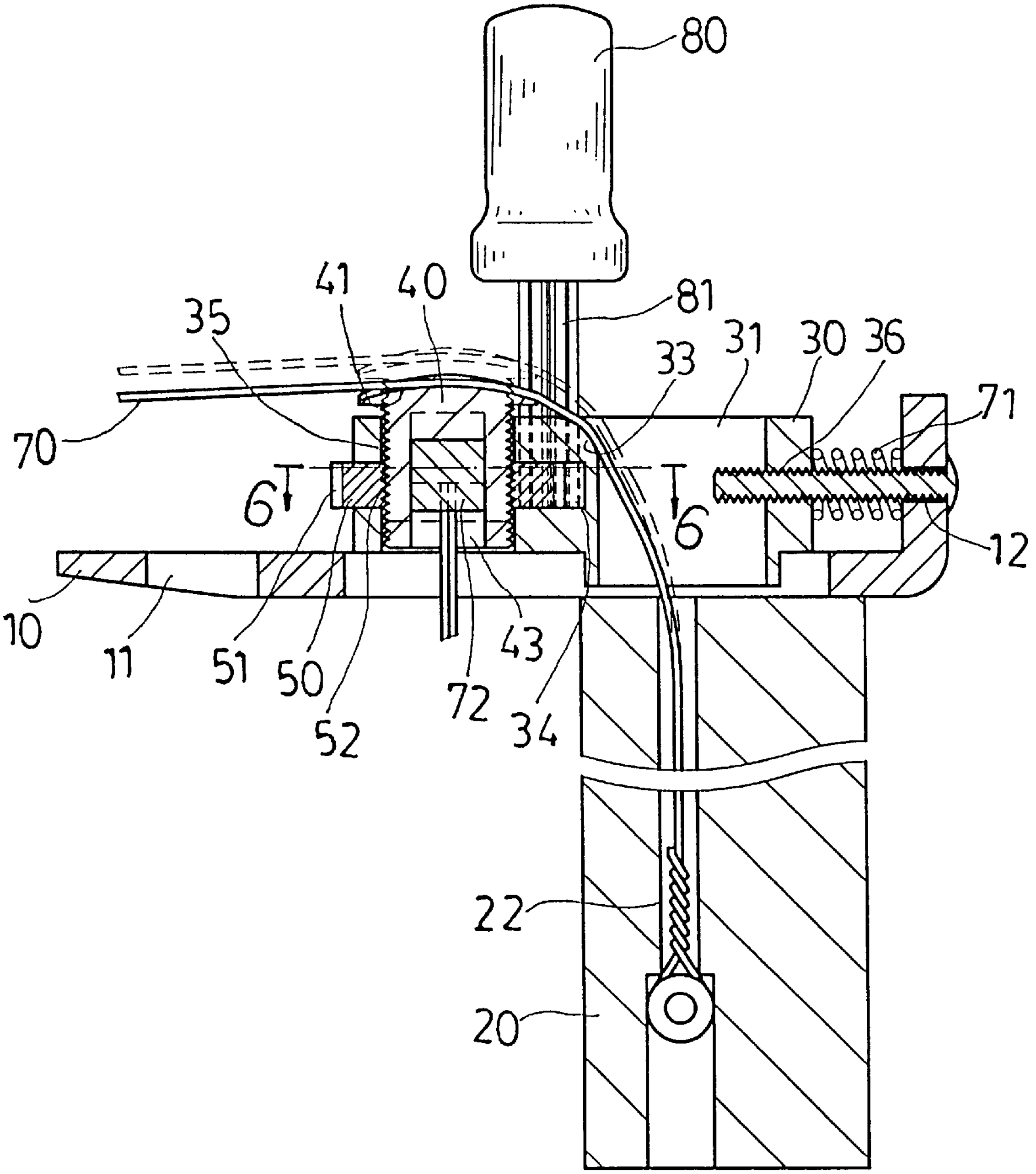
FIG. 5 is a sectional view taken along line 5—5 of FIG. 4.

Referring to FIGS. 4 and 5, strings 70 are respectively mounted in the string mounting holes 22 at the bottom block 20, then extended upwards through the transverse slots 13 at the bridge body 10 and the elongated slots 31 at the saddle blocks 30, and then guided outwards toward the head of the electric guitar by the smoothly curved string guide edge 33 at each of the elongated slots 31 and the groove 41 at the head of each of the tension screw studs 40.

Figure 6:
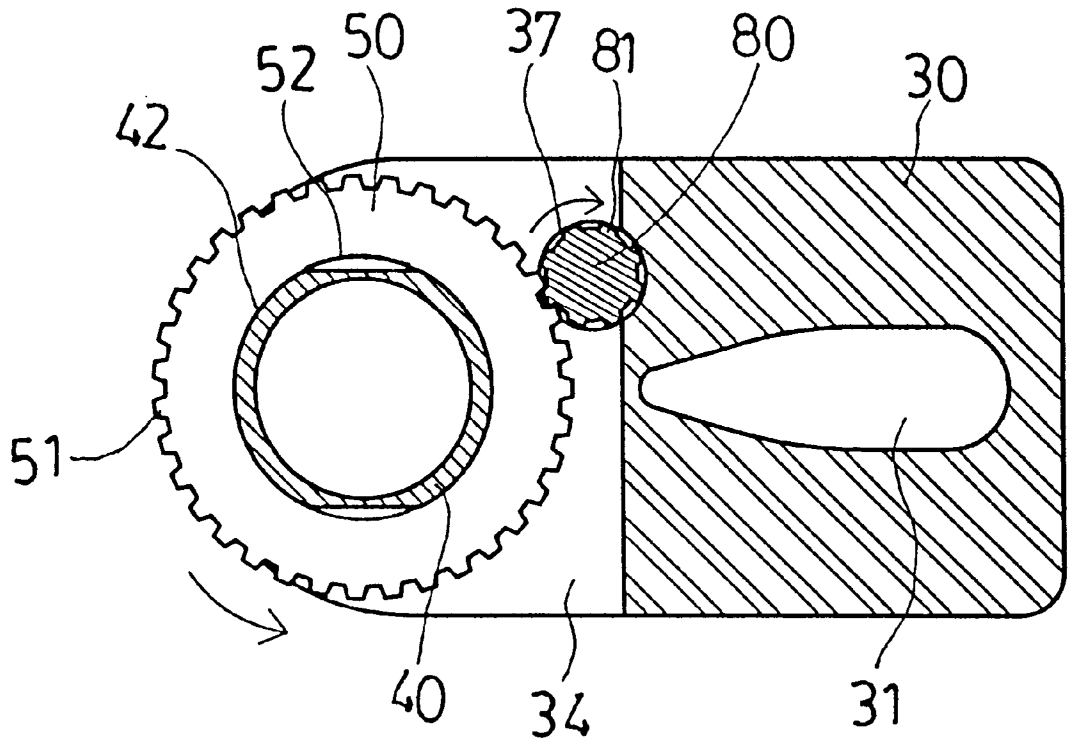
FIG. 6 is a sectional view taken along line 6—6 of FIG. 5.

Referring to FIG. 6 and FIG. 5 again, the saddle blocks 30 can respectively be moved back and forth along the transverse slots 13 at the bridge body 10 to the desired position by turning the respective screws at the through holes 12 at the bridge body 10, and the elevation of the tension screw studs 40 can respectively adjusted by turning the respective adjustment nuts 50. By inserting the toothed shank 81 of the screwdriver 80 into the insertion hole 37 at one saddle block 30 to mesh with the toothed peripheral wall 51 of the respective adjustment nut 50 and then rotating the screwdriver 80 to turn the respective adjustment nut 50, the elevation of the respective tension screw stud 40 is relatively adjusted. By means of adjusting the positions of the saddle blocks 30 at the bridge body 10 and the elevational positions of the tension screw studs 40 at the saddle blocks 30, the tension of the strings 70 are respectively adjusted. Because the threaded stems 42 of the tension screw studs 40 are non circular, and fit the non-circular vertical locating holes 35 at the saddle blocks 30, the tension screw studs 40 are constantly firmly retained in vertical.

Figure 9:
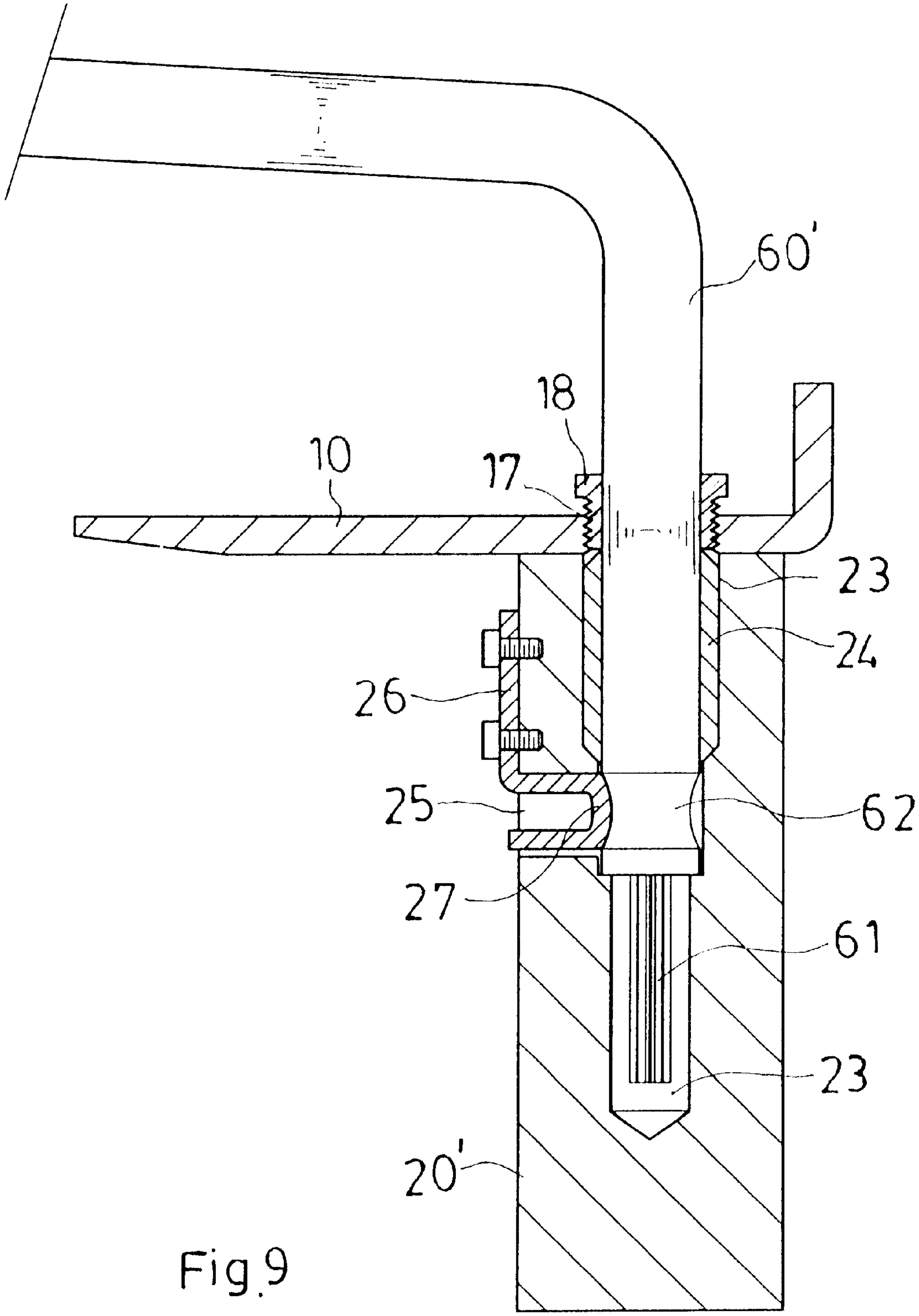
FIG. 9 is a sectional view in an enlarged scale taken along line 9—9 of FIG. 8.
Figure 10:
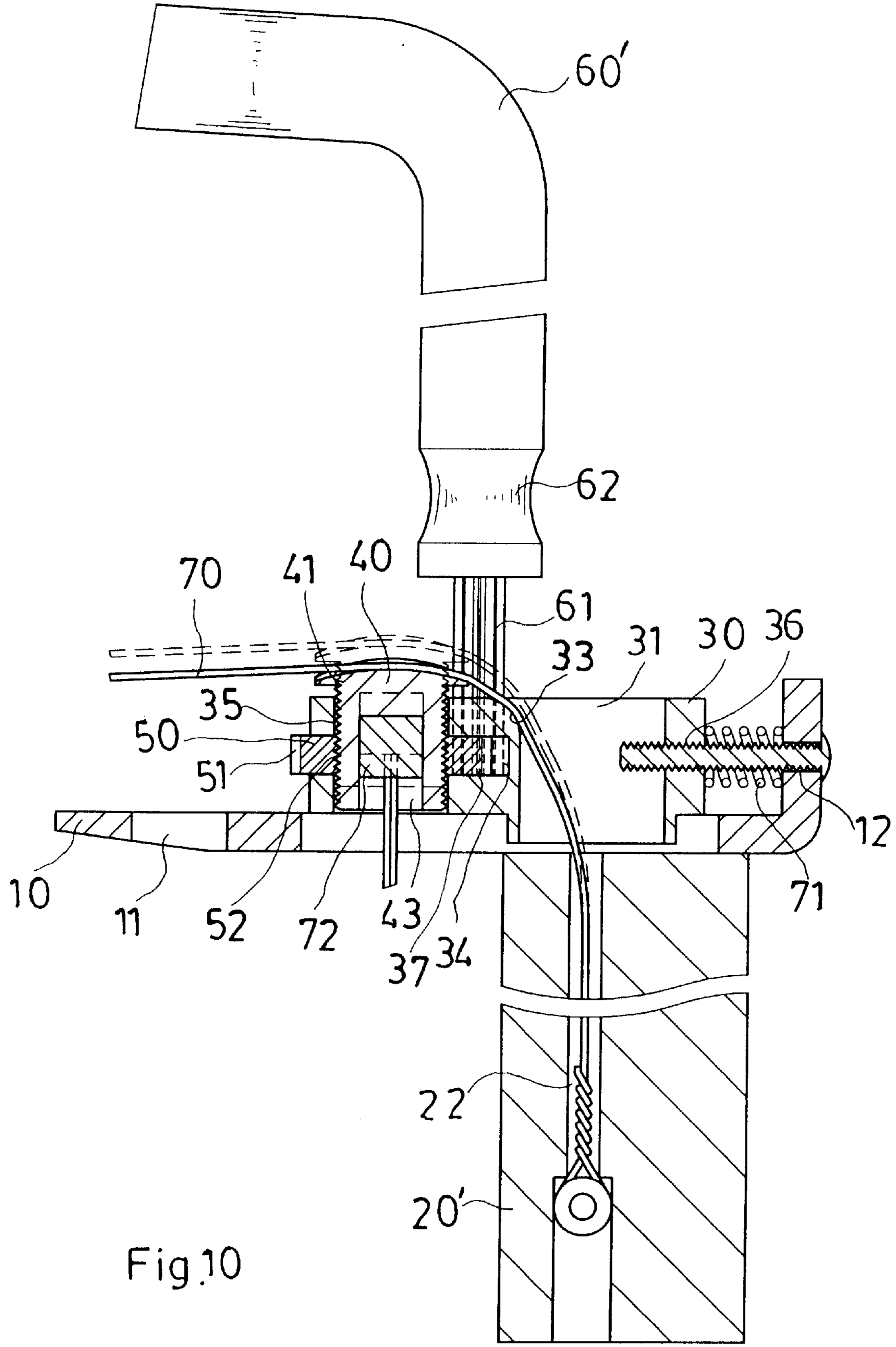
FIG. 10 is another sectional view of the string tension adjustment structure shown in FIG. 8, showing the toothed tip of the tremolo arm meshed with the adjustment nut.

Figures from 8 through 10 show an alternate form of the present invention. According to this alternate form, the tremolo arm 60' has an annular groove 62 around the periphery near its front end, and a toothed tip 61 axially extended from its front end. The tremolo arm 60' can be used as a screwdriver to rotate the adjustment nut 50 at each saddle block 30. When the toothed tip 61 of the tremolo arm 60' is inserted into the vertical insertion hole 37 at one saddle block 30, it is meshed with the toothed periphral wall 51 of the corresponding adjustment nuts 50, enabling the corresponding tension screw stud 40 to be moved upwards or downwards upon rotary motion of the tremolo arm 60' (see FIG. 10). The bridge body 10 has a screw hole 17 (instead of the aforesaid through hole 14). A hollow adjustment screw cap 18 is threaded into the screw hole 17 to hold the tremolo arm 60' at the desired elevation. The bottom block 20' comprises a vertical extended blind hole 23' (instead of the aforesaid screw hole 23) corresponding to the screw hole 17 for receiving the tremolo arm 60', and a horizontal locating hole 25 perpendicularly extended from the blind hole 23' to the outside wall thereof. A clamping spring plate 24 which is shaped like a split barrel is mounted within the blind hole 23' for securing the tremolo arm 60' in place. A retainer spring plate 26 is fixedly fastened to the outside wall of the bottom block 27 inserted into the horizontal locating hole 25 and engaged into the annular groove 62 at the tremolo arm 60' to secure the tremolo arm 60' to the bottom block 20' (see FIG. 9). By means of rotating the adjustment screw cap 18, the elevation of the tremolo arm 60' is relatively adjusted. By loosening the adjustment screw cap 18 and pulling the tremolo arm 60' upwards from the screw hole 17 with force, the tremolo arm 60' is disconnected from the bottom block 20' and the bridge body 10.

What is claimed is:

1. An electric guitar string tension adjustment structure comprising:

a bottom block, said bottom block comprising a plurality of screw holes, a row of stepped string mounting holes through top and bottom sides thereof for holding a string each, and a threaded tremolo arm mounting hole;

a bridge body supported on said bottom block, said bridge body comprising a horizontal wall and a vertical wall connected at right angles, a row of round holes respectively vertically aligned with the stepped string mounting holes at said bottom block for guiding strings out of the stepped string mounting holes at said bottom block, a row of through holes arranged at the vertical side wall corresponding to said round holes, a plurality of transverse slots arranged in parallel between said round holes and said through holes, an extension plate longitudinally extended from one end of the horizontal side wall, a through hole at said extension plate, and a plurality of countersunk holes respectively fastened to the screw holes at said bottom block by respective screws;

a tremolo arm mounted in the through hole at said extension plate of said bridge body and threaded into the threaded tremolo arm mounting hole at said bottom block;

a plurality of saddle blocks respectively mounted on said bridge body and connected to said through holes at the vertical side wall of said bridge body, said saddle blocks each comprising a front end, rear end, a bottom side wall, an elongated slot adjust to the rear end which guides a string out of one transverse slot at said bridge body, a locating flange raised from the bottom side wall of the respective saddle block around said elongated slot and moved with the respective saddle block back and forth along the corresponding transverse slot at said bridge body, a non-circular vertical locating hole near the front end, a horizontal slot at the front end across said vertical locating hole, a horizontal screw hole at the rear end connected to one through hole at the vertical side wall of said bridge body, and a vertical insertion hole spaced between said elongated slot and said non-circular vertical locating hole in communication with said horizontal slot;

a plurality of saddle block mounting screws respectively mounted in the saddle block mounting holes at the vertical side wall of said bridge body and treaded into the horizontal screw holes at the rear end of each of said saddle blocks;

a plurality of springs respectively mounted around said through holes and stopped between the vertical side wall of said bridge body and the rear end of each of said saddle blocks;

a plurality of tension screw studs respectively mounted in the vertical locating holes at said saddle blocks, said tension screw studs each comprising a round head, a string groove at said round head for guiding one string from the elongated slot of one of said saddle blocks, and a threaded, non-circular stem fitting the vertical locating hole at one of said saddle blocks;

a plurality of adjustment nuts respectively mounted in the horizontal slot at each of said saddle blocks and threaded onto the threaded, non-circular stem of each of said tension screw studs, said adjustment nuts each having a toothed peripheral wall; and a screwdriver for turning said adjustment nut, said screwdriver comprising a toothed shank, which is meshed with the toothed peripheral wall of one adjustment nut when inserted into the insertion hole at one of said saddle blocks.

2. The electric guitar string tension adjustment structure of claim 1 wherein the elongated slot of each of said saddle blocks has a smoothly curved string guide edge for guiding out a respective string out of the respective saddle block.

3. The electric guitar string tension adjustment structure of claim 1 wherein said tension screw studs each comprise an axially extended bottom hole, which receives one piezoelectric ceramic element tending to increase sound.

4. The electric guitar string tension adjustment structure of claim 1 wherein said tremolo arm has a front end terminating in a toothed tip, that can be inserted into the vertical insertion hole at one of said saddle blocks into engagement with the toothed peripheral wall of the corresponding adjustment nut, and turned with said tremolo arm to rotate the corresponding adjustment nut.

* * * * *